Sept. 13, 1949.　　　　　G. C. APPEL　　　　2,481,558
STORAGE BATTERY WITH NOTCHED PARTITION
Filed Aug. 21, 1947　　　　　　　　2 Sheets-Sheet 1
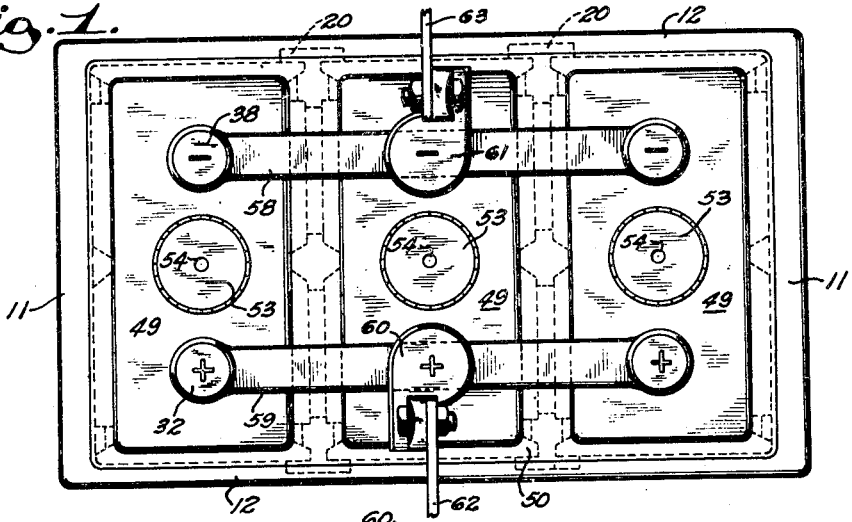
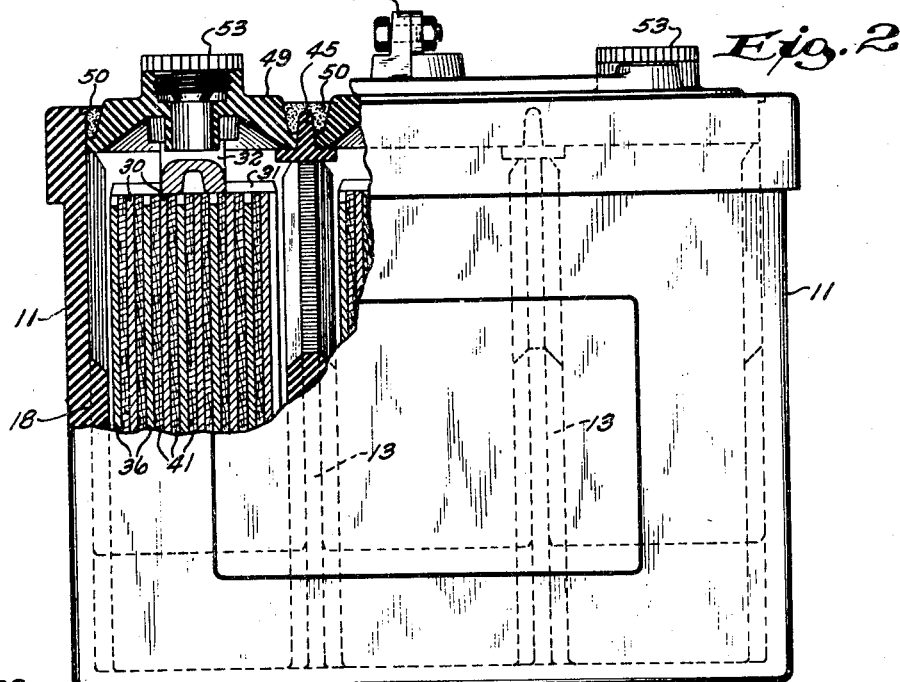
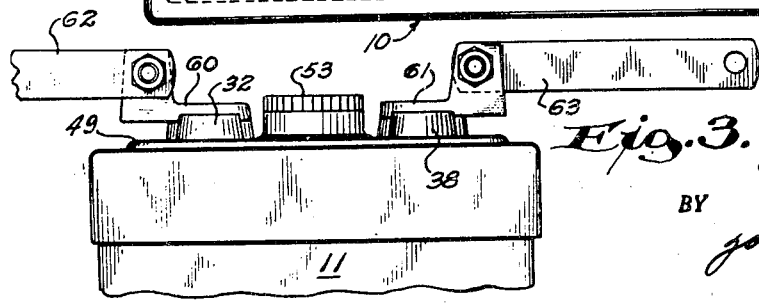
INVENTOR.
GEORGE C. APPEL
BY
John W. Michael
ATTORNEY.

Sept. 13, 1949. G. C. APPEL 2,481,558
STORAGE BATTERY WITH NOTCHED PARTITION
Filed Aug. 21, 1947 2 Sheets-Sheet 2
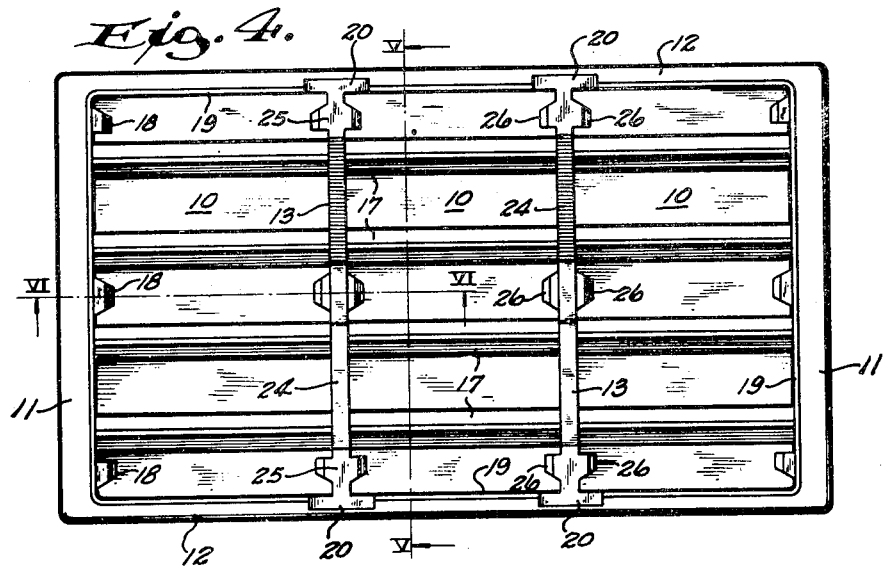
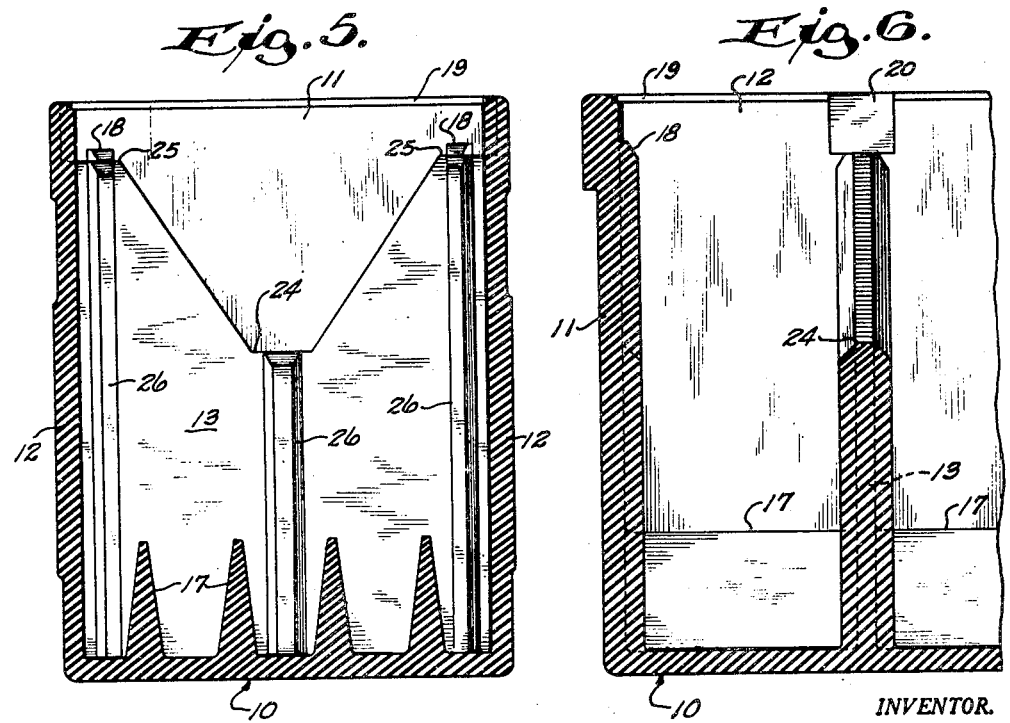
INVENTOR.
GEORGE C. APPEL
BY
John W. Michael
ATTORNEY.

Patented Sept. 13, 1949

2,481,558

UNITED STATES PATENT OFFICE 2,481,558

STORAGE BATTERY WITH NOTCHED PARTITION

George C. Appel, Milwaukee, Wis., assignor to Globe-Union Inc., Milwaukee, Wis., a corporation of Delaware Application August 21, 1947, Serial No. 769,838

6 Claims. (Cl. 136—166)

1

This invention relates to improvements in electrical batteries and in cases for electric storage batteries and particularly to cases adapted to receive a plurality of relatively small standard parts in the production of a single electrical cell.

Heretofore the individual electric systems for use in isolated locations (the so-called farm lighting sets) employed a large number of glass-cased storage batteries for the reason that only glass could be sufficiently cheaply and satisfactorily molded to the size required for other standard components of a single cell battery without the use of excessive quantities of material in the case itself. The initial cost of glass cases is high and, even with a high degree of care in handling, the breakage of glass cases was so high that the final cost of the complete battery became a major portion of the cost of a system. Accidental breakage during use was also frequent and such breakage of a single case frequently had many and serious results, particularly where the system was operated by a relatively unskilled person in a location where repair service was not readily available. Attempts to provide farm lighting set battery cases made of a moldable composition such as heretofore used for batteries for other purposes, were not successful for a number of reasons.

It is accordingly one object of the present invention to provide a moldable composition case for a storage battery in which a single case is adapted to receive a plurality of sets of standard components of the dimensions heretofore used with cases capable of receiving only a single set of such components.

Another object of the invention is to provide a single storage battery case divided into a plurality of compartments by partitions so shaped that the contents of the entire case form a single electrical cell.

Another object of the invention is to provide a moldable composition storage battery case with lighter walls than heretofore and divided substantially into a plurality of compartments by partial partitions and in which the side walls of the case are braced by members spanning the case over the partial partitions.

And a further object of the invention is to provide a storage battery case in which bracing members extending between the case side walls also serve as bridges partially supporting standard covers and severally coact with a plurality of the covers in sealing the joints between the several covers and the case walls and between the several covers.

Objects and advantages other than those above

2 set forth will be apparent from the following description when read in connection with the accompanying drawing in which:

Fig. 1 is a top plan view of a complete storage battery embodying the present invention;

Fig. 2 is a side elevation of Fig. 1 with portions broken away to show a portion of the internal construction thereof;

Fig. 3 is a fragmentary end elevation of Fig. 1;

Fig. 4 is a top plan view of a complete storage battery case embodying the present invention;

Fig. 5 is a transverse cross sectional view taken on the plane of line V—V of Fig. 4; and Fig. 6 is a longitudinal cross section view taken on the plane of line VI—VI of Fig. 4.

Generally, the present storage battery case is made of a moldable rubber containing composition with the outer walls of less thickness than heretofore in such cases and defining a rectangular open-topped space substantially divided into a plurality of compartments by partitions so designed as to secure circulation of the electrolyte between the several compartments. The partitions extend transversely of the case and are formed with substantially a V-shaped notch of a depth approximately one-half of the total height of the partition and of approximately the width of the upper partition edges but providing edge or end surfaces at the juncture of the partitions and outer walls, such surfaces being of equal size and substantially parallel with the bottom of the case.

Each compartment is adapted to receive groups of plates such as are usual in the lead-plate type of storage battery. The plates are connected into groups of like polarity by straps with a terminal post, and two groups of plates of opposite polarity are interleaved in insulated and spaced relation for free flow of electrolyte to the several plates, a double group of plates forming a unit to be received in a compartment and retained in a given relation therein by ribs extending from the compartment surfaces. The end walls and both sides of the partitions are formed with similar ribs in opposed relation and the case bottom is formed with more and larger ribs than the end walls and partitions, to space the double group of plates above the bottom and from the end walls and partitions. Each case accordingly provides a single electrical storage cell in which the electrolyte circulates freely between the compartments and about the groups of plates in each compartment.

Each of the several compartments of a single case is to be inclosed by separate covers which are to be severally sealed to the case walls and to each other to provide a complete closure for the case. Such covers are made of a composition similar to that used in the case and must accordingly be supported about their entire peripheries. Such support is furnished on at least two sides of a cover by a rabbet in the top edge of the case walls but the cover edges spanning the partition notches require a bridging member which also serves as means for positioning the cover and as means aiding in sealing the adjacent edges of covers to each other. Such bridging member also provides a brace between the otherwise unsupported upper portions of the side walls. In the present instance the bracing and bridging members are T-shaped in cross section but are made of a composition more rigid than that of the other portions of the battery case. The ends of the brace and bridging members fit snugly into niches in the case side walls so shaped and located that the bar of the T rests in the niches and on the end surfaces of the partitions when the members are positioned as shown in Fig. 2 particularly. In such inverted position the bar of the T provides ledges receiving the edges of adjacent covers while the leg of the T coacts with the covers in providing grooves in which the usual thermoplastic sealing compound is placed in at least the same quantity as is used in the grooves between the outer case walls and the cover edges resting thereon.

It will be understood that each of the covers is provided with a plurality of holes through which are severally extended the terminal posts of groups of plates of like polarity, the like polarity groups being connected in series. One of the terminals of each series of groups is adapted to be connected by suitable means with other batteries in the circuit. Each of the covers is also provided with a screw-threaded hole for filling the battery with electrolyte and for testing the electrolyte therein, such hole being drained and being closed by the usual vented plug.

Referring to the drawings by reference numerals, the storage battery case comprises a bottom 10, side walls 12, end walls 11, and partitions 13 formed as a unitary structure of a rubber-containing moldable composition. The case is open at the top and defines a rectangular space substantially divided by the partitions to define rectangular compartments of the same dimensions. The bottom 10 has ribs 17 extending upwardly therefrom and longitudinally of the case in substantially equally spaced relation across each compartment to support the several groups of plates above the bottom and prevent short-circuiting of the plates by the sludge always forming in a lead plate storage battery. The end walls 11 are formed with ribs 18 extending from the inner wall surfaces, the ribs being arranged in the juncture of the end and side walls and centrally of the end walls and being distinct from the bottom ribs 17. It will be noted that the end walls 11 are somewhat heavier than the side walls 12 and that all of such walls are formed with a rabbet 19 internally of the upper edge of the case and with spaced niches 20 formed in the side walls.

The partitions 13 severally have substantially V-shaped notches 24 framed centrally therein to bring the center line of the notches on the longitudinal axis through the case. Each notch 24 has a flattened rather than pointed apex with a depth less than one-half the height of the partition and an opening width such as to leave partition edge or end surfaces 25 substantially parallel with the bottom 10 and extending a material distance from the juncture of the side walls 12 with the partitions 13. Such end surfaces are of material and equal size and are a given distance below the bottom of the case rabbet 19 and form extensions of the bottoms of the case niches 20. Each partition is provided with a plurality of sets of vertical ribs 26 on each of the vertical partition surfaces and such ribs are formed in opposing relation with the ribs 18 on the end walls 11.

Numeral 30 designates plates of one polarity joined by a strap member 31 having a terminal post 32 and numeral 36 designates plates of the opposite polarity joined by another strap member (not shown) with another terminal post 38. A group of plates 30 and a group of plates 36 are interleaved and the individual plates are insulated from each other by separators 41 to form plate units which are severally insertable in each compartment. Such units are of standard dimensions and the compartments are of such size that the plates rest on the bottom ribs and are laterally supported by the end wall and partition ribs with the upper ends of the plates below the level of the end surfaces 25 of the partitions.

After plate units are inserted in all the compartments, bridge members 45 are placed in the niches 20 with a portion of such members resting on the end surfaces 25 of the partitions. The bracing and bridging members are substantially T-shaped with the bar of the T fitting snugly between the side walls and with the surfaces thereof forming an extension of the bottom of the case rabbet 19. The bridge members are preferably of more rigid material than the case and, fitting snugly between the side walls and on the end surfaces of the partitions, serve as braces between the side walls at locations where the V-notched partitions do not provide sufficient transverse strength for the case.

Covers 49 are now placed on the ledges formed by the bottom of the casing rabbet 19 and the surfaces of the bridging members co-planar with the rabbet, the dimensions defined by the co-planar rabbet and bridge members being such as to receive a standard cover. The cover edges are shaped to coact with the ends and side walls of the casing and with the leg of the inverted T member to define grooves in which a thermoplastic composition 50 may be poured for fixing and sealing the covers in place. It will be noted that the covers are slightly dome-shaped and that the seal between covers resting on the same bridging member is substantially level with the top of the covers, thus completely inclosing the leg of the bridge member and forming a battery top surface which will shed water over the sides thereof. Each cover is provided with a substantially central aperture which is internally screw-threaded to receive a plug 53 having a vent 54 for the escape of gas.

The cover 49 is also provided with apertures severally adjacent the ends thereof and through which terminals 32 and 8 extend for the parallel connection of the groups of like polarity plates in the several compartments by means of straps 58 and 59, thus combining the several components in each case into a single electric cell. One of each of the two groups of parallel connected terminals receive terminal clamp 60 or 61 severally connected by bars 62 or 63 with other cells in the circuit.

It will be seen that the present structure provides a unitary case substantially divided into a plurality of compartments receiving individual plate units of standard size and with the casing so formed as to permit the circulation of electrolyte through all compartments. Such structure together with the special connection of groups of plates of different polarity and forming the several plate units accordingly forms a single electric cell. Relatively thin side walls and partitions may be used so long as bracing and bridging members supplement the otherwise inadequate transfer strength of the case. The bracing and bridging members support edges of standard sized covers and coact with such covers in providing grooves receiving the composition positioning and sealing the covers in place.

Although but one embodiment of the present invention has been illustrated and described, it will be apparent to those skilled in the art that various changes and modifications may be made therein without departing from the spirit of the invention or from the scope of the appended claims.

I claim:

1. A storage battery having a case of the multi-compartment type comprising end and side walls and a partition partially dividing the case into compartments, said partition having a notch therein from the upper edge thereof, said notch having a depth substantially one-half the height of said partition and a width slightly less than the width of said partition, whereby electrolyte may circulate freely between the compartments, a unit of plates of opposite polarity in each compartment, a separate cover for each compartment, and connecting straps connecting the plates of like polarity of each compartment.

2. A storage battery case of the multi-compartment type comprising end and side walls and a partition partially dividing the case into compartments, the side walls having niches formed therein over said partition, said partition having a notch centrally therein from the upper edge thereof and end surfaces from the notched sides to the side wall surfaces, and a bridge member fitting into the side wall niches and resting on the end surfaces of said partition for bracing the side walls and for bridging over the partition notches.

3. A storage battery case of the multi-compartment type comprising end and side walls and partitions partially dividing the case into compartments, the end and side walls having an internal rabbet and the side walls having niches formed therein over the partitions, the partitions ending below the rabbet and having notches therein from the upper edge thereof, and bridge members fitting in the side wall niches and extending therebetween for bracing the side walls and for bridging over the partitions, the bottom of the rabbet and some of the surfaces of said members being substantially in a plane.

4. A storage battery case of the multi-compartment type comprising end and side walls and partitions partially dividing the case into compartments, the end and side walls having an internal rabbet and the side walls having niches therein over the partitions, the partitions having notches centrally therein from the upper edge thereof and end surfaces from the notches to the side wall surfaces, the bottom of the side wall niches and the partition end surfaces being substantially in a plane, and bridge members fitting in the side wall niches and resting on the partition and surfaces for bracing between the side walls and for bridging over the partition notches.

5. A unitary storage battery case of the multi-compartment type comprising end and side walls and partitions partially dividing the case into compartments, the end and side walls having an internal rabbet and the side walls having niches formed therein over the partitions, the partitions ending below the rabbet and having notches therein from the upper edge thereof, and T-shaped bridge members fitting in the side wall niches in inverted T position, the bottom surfaces of the rabbet and the upper surfaces of said bridge members being substantially in a plane.

6. A storage battery comprising a case, a partition dividing said case into compartments, said partition having a notch in the upper end thereof to permit free circulation of electrolyte between said compartments, a plate unit in each compartment, a bridge member secured to said case and positioned over said partition, and separate covers for each of said compartments, said bridge member providing a support for adjacent covers.

GEORGE C. APPEL.

REFERENCES CITED

The following references are of record in the file of this patent:

UNITED STATES PATENTS

| Number | Name | Date |
| --- | --- | --- |
| 770,358 | Figuccia | Sept. 20, 1904 |
| 1,888,890 | Sandman | Nov. 22, 1932 |
| 2,090,268 | Reetz | Aug. 17, 1937 |
| 2,098,908 | Ambruster | Nov. 9, 1937 |